J. L. FARNES.
NUT LOCK.
APPLICATION FILED JUNE 18, 1909.

1,017,521. Patented Feb. 13, 1912.

Witnesses
C. E. Chandlee.
C. N. Woodward.

Inventor
John L. Farnes
By Chandlee & Chandlee
Attorney

UNITED STATES PATENT OFFICE.

JOHN L. FARNES, OF REXBURG, IDAHO, ASSIGNOR OF ONE-FOURTH TO DAVID ATHAY AND LEON J. FINDLAY, BOTH OF SALT LAKE CITY, UTAH, AND ONE-FOURTH TO MATTHEW H. FARNES, OF LOGAN, UTAH.

NUT-LOCK.

1,017,521.   Specification of Letters Patent.   Patented Feb. 13, 1912.

Application filed June 18, 1909. Serial No. 502,955.

*To all whom it may concern:*

Be it known that I, JOHN L. FARNES, a citizen of the United States, residing at Rexburg, in the county of Fremont, State of Idaho, have invented certain new and useful Improvements in Nut-Locks; and I do hereby declare the following to be a full, clear, and exact description of the invention, such as will enable others skilled in the art to which it appertains to make and use the same.

This invention relates to improvements in nut locks, and has for one of its objects to improve the construction and increase the efficiency and utility of devices of this character.

Figure 1:
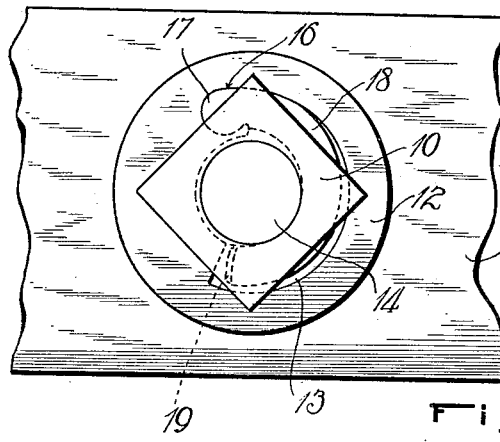
Figure 2:
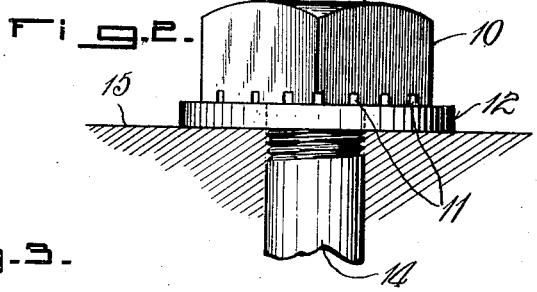
Figure 3:
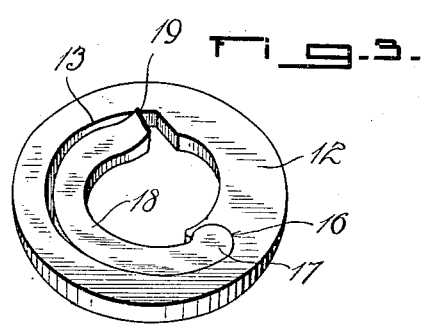
Figure 4:
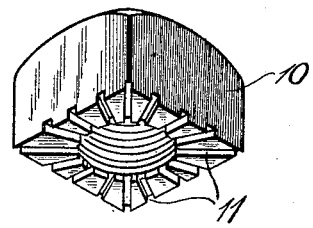
Figure 5:
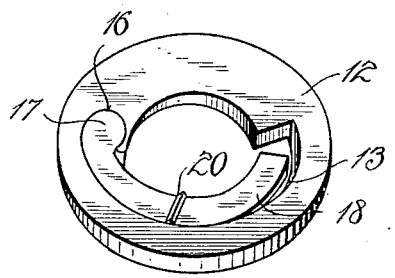

With this and other objects in view, the invention consists in certain novel features of construction as hereinafter shown and described and then specifically pointed out in the claim, and in the drawings illustrative of the preferred embodiment of the invention, Figure 1 is a plan view of the improved device. Fig. 2 is a side view of the same. Fig. 3 is a perspective view of the washer portion of the improved device viewed from above. Fig. 4 is a perspective view inverted of the washer portion of the improved device. Fig. 5 is a perspective view, from beneath, of the nut.

The improved device comprises a nut 10 having a plurality of radially arranged recesses 11 in its inner face. Any required number of the recesses may be employed, and it is not desired therefore to limit the invention to a nut having any specific number of the recesses.

The nut is arranged to bear upon a washer member represented at 12 and provided with a segmental recess 13 opening into the usual central aperture which engages around the bolt, the bolt being represented at 14. The washer 12 bears upon the structure through which the bolt operates, the supporting structure being indicated at 15.

At one end the recess 13 is formed into a socket 16, and fitting in this socket is the enlarged end 17 of a segmental tongue 18, the tongue fitting around one side of the bolt and provided with a wedge shaped enlargement 19 which projects normally above the main surface of the washer as shown in Figs. 2 and 3. The tongue 18 is formed of resilient material, such as highly tempered steel, and is thinner at the end from which the projection 19 extends, so that when the nut 10 is turned home the recesses 11 pass over the projection 19 and depress the member 18, but the resiliency of the member 18 effectually prevents any retrograde movement to the nut, as will be understood. The member 18—19 thus serves as an effective pawl to hold the nut from backward movement.

The washer 12 may be constructed of relatively soft cheap material, and may be constructed of relatively soft cast iron which is able to withstand severe pressure without fracture, while the member 18—19 only need be formed of the more expensive steel.

Projecting from the opposite face of the member 18— from the projection 19 is a rib 20, adapted to press into the structure 15 when pressure is applied to the nut, and thus effectually prevent rotary movement to the washer. This rib 20 is effective either upon structures of metal or wood, but when the structure through which the bolt passes is of wood the rib will readily enter the wood, as will be understood, and when the structure 15 is of metal, the rib simply forms for itself a slight depression, which produces the desired holding effect.

What is claimed is:—

In a nut lock, a washer having a bolt opening therethrough and an arcuate aperture at one side communicating with the bolt opening throughout a portion of its circumference and terminating at one end in a circular enlargement, a stop pawl corresponding in shape to said arcuate aperture and terminating at one end in a circular head adapted to be engaged in the circular enlargement of said aperture whereby the pawl is held out of the bolt opening, the other end of said pawl extending above the surface of the washer, said pawl being provided upon its lower face intermediate its length with a transversely extending rib, and a nut bearing upon said washer and provided with a plurality of radial recesses to be engaged by the extended terminal of the pawl.

In testimony whereof, I affix my signature, in presence of two witnesses.

JOHN L. FARNES.

Witnesses:
L. G. RYLAND,
K. H. RYLAND.

Copies of this patent may be obtained for five cents each, by addressing the "Commissioner of Patents, Washington, D. C."